UNITED STATES PATENT OFFICE

2,476,165

ALPHA, ALPHA'-TRITHIOCARBONO-DIALIPHATIC ACIDS

Stephen J. Wayo, Whiting, Ind., assignor to Sinclair Refining Company, New York, N. Y., a corporation of Maine No Drawing. Application June 8, 1945, Serial No. 598,415

8 Claims. (Cl. 260—399)

This invention relates to novel alpha-substituted dialiphatic acids. It provides new compositions of matter, and also provides a method by which the new compositions of matter may with advantage be prepared.

The products of my present invention may, according to conventional nomenclature, be designated alpha, alpha'-trithiocarbono-dialiphatic acids, and may be represented by the structural formula:

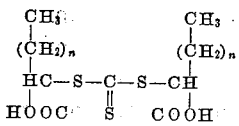

where $n$ represents one of the integers 13 and 15.

These novel compositions of matter have been found to be of particular utility as rust inhibiting addends in the compounding of mineral oil compositions, for instance, compositions intended for use as turbine oils or the like.

My present invention is predicated upon the discovery that if the sodium salt of an alpha-halo-aliphatic acid of the class described be caused to react in alcoholic solution with disodium trithiocarbonate the latter will displace the alpha-halogen atoms from two molecules of the alpha-halo-aliphatic acid salt to form the sodium salt of the corresponding alpha, alpha'-trithiocarbono-dialiphatic acid, which may be converted to the free thiodi-acid by reaction with a strong mineral acid, for instance sulfuric acid or hydrochloric acid.

Accordingly, the compositions of my present invention may be prepared by reacting a sodium salt of an alpha-halo-stearic acid, -palmitic acid, or mixtures thereof, in alcoholic solution with disodium trithiocarbonate, separating the resultant thiodi-acid salt from the alcoholic solution, and acidifying the separated thiodi-acid salt by treatment in aqueous suspension with a mineral acid, for instance hydrochloric acid, to convert the thiodi-acid salt to the free thiodi-acid.

The disodium trithiocarbonate used in the production of my new compounds may be prepared by reacting carbon disulfide with an aqueous solution of sodium sulfide.

The sodium salt of the alpha-halo-aliphatic acid used is with advantage prepared from an alpha-brominated aliphatic acid, i. e. stearic or palmitic, though other alpha-halo-aliphatic acids may be used, for instance alpha-chlorostearic acid, or alpha-chloropalmitic acid, or mixtures thereof.

The alpha-bromoaliphatic acid may be prepared by reacting bromine with stearic acid or palmitic acid or mixtures thereof in the presence of red phosphorus. This reaction results in the formation of alpha-bromostearic acid bromide, for instance, where stearic acid is used, which is readily hydrolized to form alpha-bromostearic acid. Where palmitic acid is similarly treated, alpha-bromopalmitic acid will result, and similarly, a mixture of stearic acid and palmitic acid, when so treated, will result in a mixture of alpha-bromostearic acid and alpha-bromopalimitic acid.

The process of my present invention will be illustrated by the following specific example of its application to the preparation of alpha, alpha'-trithiocarbono-dialiphatic acid of the present invention, using alpha-bromostearic acid prepared from double-pressed stearic acid.

An aqueous solution of disodium trithiocarbonate was first prepared by shaking 5.3 grams of carbon disulfide with a solution of 14.4 grams of crystalline sodium sulfide ($Na_2S \cdot 9H_2O$) in 50 cc. of water. I then dissolved 36 grams of alpha-bromostearic acid in 100 cc. of 50% ethyl alcohol in a 1-liter Erlenmeyer flask. To this solution I added, with cooling, 5.5 grams of sodium carbonate in 25 cc. of water to form the sodium salt of the bromostearic acid. Thereafter, I added to the resultant solution, 50 cc. of the aqueous solution of disodium trithiocarbonate, prepared as previously described, and raised the alcohol concentration of the solution to about 70% by the addition of 325 cc. of 95% ethyl alcohol. This mixture was then heated for four hours on a steam bath with refluxing and then cooled to room temperature to effect the completion of the precipitation of the sodium soap. The reaction mixture was then filtered, and the olive green precipitate thus obtained was suspended in 200 cc. of water in a 1-liter separatory funnel and treated with an excess of dilute (1:3) hydrochloric acid. The liberated thiodiacids were then extracted with 300 cc. of benzene and the benzene extract washed with hot water and allowed to stand. Upon standing, the mixture separated into an aqueous phase and a benzene phase. The washed benzene phase, which contained the fatty acid reaction product, was then filtered to remove droplets of water and the solvent was evaporated therefrom on a steam bath.

By the foregoing procedure I have produced 23.8 grams of a crude product found by analysis to contain 67% of alpha, alpha'-trithiocarbonodialiphatic acids, this being equivalent to 77.5% of the theoretical yield. The crude product was a clear viscous brown liquid which slowly solidified to a stiff, waxy paste.

The fatty acid, from which the alpha-bromo-aliphatic acid used in the foregoing example was made, was a commercial, double-pressed stearic acid having the approximate composition: 45% stearic acid, 45% palmitic acid, and 10% oleic acid. When brominated by the process previously noted, the oleic acid appears to be converted to 2, 9, 10-tribromostearic acid and some dibromostearic and dibromopalmitic acids. Before use of the material in the foregoing operation, these impurities were separated from the mono-alpha-bromo-acids by recrystallization of the crude mixture from benzene solution.

The resulting mono-bromoacid mixture contained approximately equal parts of alpha-bromostearic acid and alpha-bromopalmitic acid, and when reacted with the sodium carbonate and the disodium trithiocarbonate and acidified as previously described, resulted in the formation of a mixture of alpha, alpha'-trithiocarbono-di-acids, apparently consisting of about 25% di-stearic acid, about 25% of dipalmitic acid, and about 50% of a thiodi-acid formed from one molecule of stearic acid and one molecule of palmitic acid.

The product prepared as herein described was found by analysis to have a neutralization value of 170.5 and to contain 10.50% sulfur and 3.03% bromine.

For converting the intermediate thiodi-acid salt to the free di-acid, it is desirable to use an excess of the mineral acid. Sulfuric acid may be used for this purpose, but hydrochloric acid has been found particularly advantageous. Also, in reacting the alpha-halo-aliphatic acid salt with the disodium trithiocarbonate to form the thiodi-acid salt, it is desirable that the reaction be carried as nearly as possible to completion so as to displace the bromine to the fullest extent practical. This is particularly desirable where the presence of a substantial amount of bromine as an impurity in the product is objectionable. Instead of ethyl alcohol, other low molecular weight alcohols such as methyl, propyl or butyl, may be used as the solvent for the reaction mixture.

I claim:

1. As a composition of matter, alpha, alpha'-trithiocarbono-dialiphatic acid represented by the structural formula

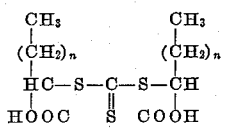

where $n$ represents one of the integers 13 and 15.

2. As a composition of matter, alpha, alpha'-trithiocarbono-distearic acid.

3. As a composition of matter, alpha, alpha'-trithiocarbono-dipalmitic acid.

4. A process for the production of alpha, alpha'-trithiocarbono-dialiphatic acid comprising reacting the sodium salt of an alpha-halo-aliphatic acid of the class consisting of alpha-halo stearic acid, alpha-halo palmitic acid, and mixtures thereof, in alcoholic solution with disodium trithiocarbonate, separating the resultant thiodi-acid salt from the alcoholic solution, and acidifying the separated thiodi-acid salt by treatment in aqueous suspension with a mineral acid.

5. A process for the production of alpha, alpha'-trithiocarbono-dialiphatic acid comprising reacting the sodium salt of an alpha-halo-aliphatic acid of the class consisting of alpha-halo stearic acid, alpha-halo palmitic acid, and mixtures thereof, in alcoholic solution with disodium trithiocarbonate, separating the resultant thiodi-acid salt from the alcoholic solution, and acidifying the separated thiodi-acid salt by treatment in aqueous suspension with hydrochloric acid.

6. A process for the production of alpha, alpha'-trithiocarbono-dialiphatic acid comprising reacting the sodium salt of an alpha-halo-aliphatic acid of the class consisting of alpha-halo stearic acid, alpha-halo palmitic acid, and mixtures thereof, in solution in ethyl alcohol with disodium trithiocarbonate, separating the resultant thiodi-acid salt from the alcoholic solution, and acidifying the separated thiodi-acid salt by treatment in aqueous suspension with hydrochloric acid.

7. A process for the production of alpha, alpha'-trithiocarbono-distearic acid comprising reacting the sodium salt of alpha-bromostearic acid in solution in ethyl alcohol with disodium trithiocarbonate, separating the resultant thiodi-acid salt from the alcoholic solution, and acidifying the separated thiodi-acid salt by treatment in aqueous suspension with hydrochloric acid.

8. A process for the production of alpha, alpha'-trithiocarbono-dipalmitic acid comprising reacting the sodium salt of alpha-bromopalmitic acid in solution in ethyl alcohol with disodium trithiocarbonate, separating the resultant thiodi-acid salt from the alcoholic solution, and acidifying the separated thiodi-acid salt by treatment in aqueous suspension with hydrochloric acid.

STEPHEN J. WAYO.

REFERENCES CITED

The following references are of record in the file of this patent:

UNITED STATES PATENTS

| Number | Name | Date |
|---|---|---|
| 2,020,021 | Farrington et al. | Nov. 5, 1935 |
| 2,368,670 | Lincoln et al. | Feb. 6, 1945 |
| 2,369,150 | Lincoln et al. | Feb. 13, 1945 |

OTHER REFERENCES

Beilstein-Vierte Auflage, 1921 edition, Band III—page 353, Syst. 220; page 291, Syst. 221; page 300, Syst. 222.

Beilstein-Vierte Auflage, 1943 edition. Edwards Bros., Band III—IV, page 190, Syst. 221, both citing Beilman, Holmberg.